United States Patent
Buch et al.

(10) Patent No.: US 8,241,497 B2
(45) Date of Patent: Aug. 14, 2012

(54) METHOD FOR STIRRING AND/OR AERATING FLUIDS, PARTICULARLY SEWAGE, PARTICULARLY USING A FLOODABLE AERATOR

(75) Inventors: Stephan Buch, Hochstetten-Dhaun (DE); Peter Kröner, München (DE)

(73) Assignee: Bioworks Verfahrenstechnik GmbH, Putzbrunn (DE)

( * ) Notice: Subject to any disclaimer, the term of this patent is extended or adjusted under 35 U.S.C. 154(b) by 290 days.

(21) Appl. No.: 12/669,095

(22) PCT Filed: Jul. 7, 2008

(86) PCT No.: PCT/EP2008/005527
§ 371 (c)(1),
(2), (4) Date: Jan. 14, 2010

(87) PCT Pub. No.: WO2009/010204
PCT Pub. Date: Jan. 22, 2009

(65) Prior Publication Data
US 2010/0181263 A1 Jul. 22, 2010

(30) Foreign Application Priority Data

Jul. 18, 2007 (DE) .......................... 10 2007 033 483
Apr. 30, 2008 (DE) .......................... 10 2008 021 649

(51) Int. Cl.
*C02F 3/30* (2006.01)
*B01F 3/04* (2006.01)
(52) U.S. Cl. ..... 210/605; 210/629; 210/630; 210/221.2; 261/DIG. 70

(58) Field of Classification Search .................. 210/605, 210/620, 629, 630, 220, 221.1, 221.2; 261/77, 261/97, DIG. 70
See application file for complete search history.

(56) References Cited

U.S. PATENT DOCUMENTS 3,160,685 A 12/1964 Chase
(Continued)

FOREIGN PATENT DOCUMENTS

CA 2313135 A1 12/2001
(Continued)

OTHER PUBLICATIONS

International Preliminary Report on Patentability for PCT/EP2008/005527, dated Feb. 9, 2010.
(Continued)

*Primary Examiner* — Fred Prince
(74) *Attorney, Agent, or Firm* — Pearne & Gordon LLP

(57) ABSTRACT

The invention relates to a method for stirring and/or aerating fluids, particularly sewage, having the following cyclically repeated steps: aerating the fluid by means of an immersed aerator for a predetermined first period of time (t1) using an aeration device (1) disposed on a carrier (3, 43) designed as a floodable hollow body (2, 42), the hollow body (2, 42) being flooded and air being brought into the fluid by the aeration device, whereby the potential for nitrification is created in the fluid; stirring the fluid by means of the immersed aerator for a predetermined second period of time (t2), the air infeed by the aeration device (1) being throttled or turned off, and previously flooded hollow body being evacuated in order to fill the hollow body (2, 42) with gar or air, the immersed aerator assuming the function of mixing device in which fluid rises upward, thus mixing the fluid, where in the potential for denitrification is created in the fluid; and an immersed aerator.

17 Claims, 7 Drawing Sheets

U.S. PATENT DOCUMENTS

| | | | |
|---|---|---|---|
| 4,073,146 A * | 2/1978 | Atencio | 405/78 |
| 4,294,696 A * | 10/1981 | Thayer | 210/220 |
| 4,474,714 A * | 10/1984 | Downs | 261/124 |
| 4,639,314 A * | 1/1987 | Tyer | 210/220 |
| 5,183,595 A | 2/1993 | Schuessler | |
| 5,587,114 A | 12/1996 | Tharp | |
| 5,851,448 A | 12/1998 | Tyer | |
| 5,906,774 A | 5/1999 | Loy | |
| 6,086,056 A | 7/2000 | Leask et al. | |
| 2006/0027496 A1 | 2/2006 | Campion et al. | |
| 2008/0224337 A1 | 9/2008 | Tharp | |

FOREIGN PATENT DOCUMENTS

| | | |
|---|---|---|
| EP | 0163821 A1 | 12/1985 |
| EP | 0249172 A1 | 12/1987 |
| EP | 0947473 A1 | 10/1999 |
| FR | 2802524 A | 6/2001 |
| GB | 2431598 A | 5/2007 |
| JP | 59-12797 A * | 1/1984 |
| JP | 2005-52773 A * | 3/2005 |

OTHER PUBLICATIONS

International Search Report for PCT/EP2008/005527, dated Oct. 17, 2008.

* cited by examiner

METHOD FOR STIRRING AND/OR AERATING FLUIDS, PARTICULARLY SEWAGE, PARTICULARLY USING A FLOODABLE AERATOR

The present invention relates to a process for liquor, particularly wastewater, agitation, particularly with a floodable immersed aerator and with at least one diffuser disposed on a carrier.

Modern wastewater/sewage plants need to denitrify the wastewater to attain the specified capped nitrate values. Denitrification—in other words dissociating the oxygen bound to the nitrate to thus liberate the molecular nitrogen—requires several biological phases by bacteria suitable for the purpose in the anoxic environment, i.e. in the absence of dissolved oxygen in the reactor.

Optimizing denitrification requires, for one thing, intensive agitation of the biomass (bacteria) with the wastewater to increase the interface and accelerate discharge of the denitrified medium, for another, the existence of degradable carbon compounds. For, it is the aerobic C degradation that firstly "forces"—to put it simply—denitrification to fetch the oxygen from the nitrate.

Doing this is currently performed by a variety of phases in processing, all of which, however, are characterized by the creation of an anoxic environment. Depending on how high the concentration is in the nitrogen supply, anoxic volumes as high as 50% of the total reactor volume are needed and usual.

But wastewater/sewage treatment in general (oxidation of carbon products, oxidation of the ammonia) always necessitates an oxic environment in which treatment (degradation of C and ammonia) is mainly aerobic, whereas in any reactor having a predominantly oxic environment denitrification is impossible.

This has resulted in a variety of ways of getting round this problem, including, for example, simultaneous denitrification, and upstream and downstream denitrification.

In upstream denitrification the return sludge (a mixture of biomass and richly nitrated wastewater) is separately basined where it is mixed with a highly carbonated flow of water.

In simultaneous denitrification the phases in the process are performed all at the same time in a reactor involving separation of oxic/anoxic volumes either spatially (by zoning the basin by throttling aeration definedly) or in time (cyclic ON/OFF of aeration), combinations of these phases also being possible.

In downstream denitrification, as the name suggests, denitrification occurs after actual aeration. All three of these processes have their specific advantages and disadvantages, especially downstream denitrification having since become outdated.

In summary it can be said that simultaneous denitrification offers the most benefits, this prompting the following considerations:

When a basin is aerated, C and ammonia degradation (oxidation) is normal. But when denitrification is needed at the same time, either the aeration needs to be throttled locally or shut off completely. However, to circulate a certain reactor volume a critical minimum air feed is needed to keep the balance of the biomass to make denitrification possible in the first place and in preventing the plant from become fouled up.

In other words, when shutting off aeration completely, agitators are needed to agitate the basin contents to ensure the necessary interfacial mass transfer as is usual in practice. But if aeration is simply throttled it may happen that the oxygen introduced is still too high, resulting in no anoxic zones materializing, thus ruining the chances of effective denitrification being achieved. This is especially the case when the wastewater feed has a low C concentration, resulting in the air flow needed for circulation still exceeding the air flow (or oxygen requirement) needed for oxidation by the bacteria.

Known from European patent EP 0 249 172 B1 (von Nordenskjöld) is a process for aerating and circulating wastewater and activated sludge for the purpose of nitrification and denitrification by means of a plurality of diffusers moved over the bottom of the basin in a cyclic sweeping action. For this purpose certain bottom diffusers are supplied with a reduced air feed to form slightly aerated zones in the wastewater or activated sludge to achieve the anoxic conditions in making zoned denitrification possible.

The drawback of this system is its many components such as squeeze valves susceptible to failure.

For aerating and agitating wastewater a wealth of different means and processes are known from prior art.

Known from DE 196 21 116 C2 (Invent) e.g. is a bottom distributor for gas to which at least one flexible perforated tube can be connected for gas charging, including, communicatingly connected to a diffuser, a hollow base body provided as a bottom distributor for the diffuser supply. To maintain such a device operative near to the bottom, when used in water treatment plants, suitable weights have to be provided to compensate the flotation tendency caused by the cavities in the bottom distributor.

Known from DE 40 01 201 C1 (von Nordenskjöld) is a floating aerator for introducing air to aerate a body of water in supplying air thereto via connecting lines via bottom diffusers employed as a so-called immersed aerator. The problem here is that bottom diffusers have a limited lifetime with the nuisance of requiring regular cleaning maintenance and inspection. This requires, as a rule, the bottom diffusers to be lifted out of the basin during operation of water or wastewater treatment plant. And, here again, these regularly require weights to weigh the system to compensate a float tendency of the bottom diffusers in operation. Lifting a bottom diffuser out of the basin is not simple, it needing to be lifted to the water surface of an activated sludge basin of a wastewater treatment plant (for cleaning, inspection, and possibly repair) and then to be returned in place. All this is highly complicated and costly and even a hazard for personnel doing the work. Apart from this the corresponding parts of the floating or bottom diffusers or also immersed aerators are stressed to the extreme. Especially when the aerators include membranes, damage to these sensitive items can hardly be avoided.

Known from U.S. Pat. No. 5,906,774 (Parkson) is a surface aerator connected by a rod to a submerged (immersed) aerator in the region of which additional inflatable buoyant members are arranged to help get round the aforementioned problem of lifting an immersed aerator to the surface of the water which is a great help in servicing it. However, this system has the serious drawback that the inflatable buoyant members add to the components in the vicinity of the immersed aerator which are a nuisance to handle, both non-inflated and inflated, whilst being prone to damage by becoming punctured and thus useless.

Surface aerators are employed in the operation of wastewater treatment plants, i.e. floats to which the surface aerators are attached submerged in the water body. It is especially in wastewater treatment plants that such devices are used to aerate the activated sludge basin. Another use serves to oxygenate water bodies. The way these work, known in principle, involves a pressurized aeration system in which air is sucked in from the atmosphere by compressors and distributed by a feeding system to the so-called immersed aerators engineered, as a rule, to discharge the drawn-in air in fine bubbles which rise to the surface of the water from the immersed aerator, giving off oxygen to the water on their way. In anaerobic systems these devices are likewise employed as gas injectors on the same principle, especially for circulation. As compared to diffuser members secured to the bottom of the basin as in classic wastewater treatment plants surface aeration has special advantages, this being the reason why surface aerators have since become very popular.

The increase in the size of individual systems also adds to the number of diffuser members per system, these very quickly amounting to several thousand such members within a system. Known are devices in which so-called diffuser tubes are grouped together into aerators attached to floating air distribution tubing for submersed operation at the bottom of the basin. Known diffuser tubes are made of polyester or ceramics and perforated membrane materials which, as a rule, are lifted to the surface on supporting members. Particularly perforated membrane diffusers have become popular in recent years since their oxygen exploitation is greatly superior to that of other diffuser materials. In addition to these, plate aerators find application.

The increase in size of such plants has called for ever-larger individual basins and water depths, nowadays often six meters deep, necessitating grouping together more and more diffuser tubes to form an aerator assembly. One salient feature of a functional "floating" immersed aerator is that its submersed components have a stable working depth without excessive buoyancy which would otherwise render the immersed aerator useless, i.e. becoming unstable, resulting in the diffuser members becoming partly floated, entangled, and endangering effective aeration, or even bringing the system to a standstill. In addition to this, it will readily be appreciated that such random movements of the diffuser members can be damaging. This is why any optimally designed immersed aerator has just enough dead weight to, on the one hand, maintain the aerator in stable operation, whilst, on the other, keeping the weight down sufficiently to assist handling by assembly and operating personnel.

The diffuser assemblies described hitherto are exposed to high wear and tear in operation, they needing to be cleaned regularly and the membranes replaced new after a certain lifetime. This necessitates lifting the diffuser assembly or immersed aerators to the water surface, done, as a rule, without halting plant operation. Lifting aerators out of the water is a difficult operation prone to damage, usually involving an experienced crew of workers. A particular nuisance to safe handling is the "biological" slime fouling of the many normally submersed surfaces rendering them slippery to handle. In addition to this, the aerators and their ancillary facilities are often stressed when lifted out of the water, risking damage such as tube kinking, tube connector breakage and diffuser membrane rupture. Lengthy handling of individual surface or immersed aerators poses the particular drawback of the activated sludge in the water zone worked by a particular immersed aerator becoming imbalanced to negatively affecting the biological process as a whole.

It is thus an object of the invention to propose a process with which the cited drawbacks of prior art are avoided or at least greatly reduced, and to propose an immersed aerator which can now be employed to advantage in the proposed process.

This object is achieved by a process for liquor—particularly wastewater—agitation and/or aeration having the following cyclically repeated steps a) and b):

a) aerating the liquor by means of an immersed aerator for a predetermined first period of time (t1) using a diffuser disposed on a carrier designed as a floodable hollow body, the hollow body being flooded and air being brought into the liquor by the diffuser, making it possible to create nitrification in the liquor;

b) agitating the liquor by means of the immersed aerator for a predetermined second period of time (t2), the air feed by the diffuser being throttled or turned off, and the previously flooded hollow body being evacuated in order to fill the hollow body with gas or air, the immersed aerator assuming the function of an agitator by rising upward in the liquor, thus agitating the liquor, making denitrification possible in the liquor.

The advantages of the process in accordance with the invention consist inter alia of aeration, after a certain period of time, now being followed by a period of non-aeration in which an anoxic zone is created in the corresponding zone of the liquor, since aeration is totally ceased therein. Instead, an agitation phase is set by the hollow body being cyclically flooded and evacuated. It is this cyclic flooding and evacuation of the hollow body which causes the aerator to continually bob up and down, agitating the liquor.

Any air escaping during this highly agitated agitating of the liquor is immaterial to the oxygen content of the liquor since, on the one hand, the volume of air involved is much less than that in normal aeration and, on the other, the escaping air has such large bubbles that there is hardly any transfer of oxygen, i.e. with no risk of endangering the anoxic phase. As detailed above, the person skilled in the art is aware that anoxic phases need to be present for denitrification, which, however, have to be replaced by oxic phases to achieve nitrification.

In one advantageous further embodiment of the process the first and second periods of time (t1, t2) are timed by a controller with the advantage of this now making it possible to precisely define denitrification to the corresponding load on the liquor.

The object is achieved furthermore by an immersed aerator comprising at least one diffuser disposed on a carrier, the immersed aerator being characterized by it comprising at least one floodable hollow body formed by the carrier. The device in accordance with the invention has numerous benefits. The carrier configured as a floodable hollow body to carry the diffuser is of decisive assistance in reducing the buoyancy tendency of the immersed aerator when filled with water in operation, thus doing away with, or at least minimizing, the need for ballast weights to compensate buoyancy so that the aerator is stationed stabilized, in thus avoiding an excessive dead weight of the immersed aerator.

In one advantageous aspect of the invention the floodable hollow body is configured as an elongated tube with the advantage that low-cost standard parts can now be used in producing the immersed aerator in accordance with the invention.

In another advantageous aspect of the invention the immersed aerator carrier configured as a floodable hollow body is configured as a tube of rectangular, round or elliptic cross-section. Thus now makes it possible to individualize the immersed aerator to preferred diffusers.

In yet another advantageous aspect of the invention the floodable hollow body is equipped with a compressed air feeder for filling the hollow body with gas or air, this device making it easy to surface the device in accordance with the invention in the water simply by feeding the compressed air to remove the water in the floodable hollow body, prompting the immersed aerator to surface since the hollow body is no longer flooded. As an alternative, the compressed air feed can be made by a source of compressed air on a maintenance boat, by a feeder specifically included for this purpose in the plant or by making corresponding use of the air for aerating the water.

In still another advantageous aspect of the invention the carrier of the immersed aerator in accordance with the invention is equipped at least partly with a perforated membrane enveloping the latter and a means for feeding gas between the carrier and the membrane. This now makes it possible to advantage to achieve the diffusers as known substantially from prior art, particularly in combination with the invention by much simpler means. The carrier configured as an elongated tube forms by its outer wall a wall of the air feeder of the diffuser, the other wall of which is formed by a perforated membrane which except for the pores is sealed off gas-tight from the carrier.

In another advantageous aspect of the invention the hollow body of the immersed aerator comprises at least one first end part disposed in a first end portion of the hollow body with a first passageway for feeding compressed air to the diffuser and a second passageway for feeding compressed air to fill the hollow body with gas or air. There is a whole series of methods known from prior art for maintaining air injectors at a constant level below the water surface. As compared to these, however, the configuration of the device in accordance with the invention now makes for a design requiring fewer parts and more friendly installation, all of which makes for enormous cost savings and saving time both in installing and servicing the immersed aerator.

In another particularly advantageous aspect of the invention the immersed aerator is characterized by it comprising a second end part with a passageway for feeding the diffuser with gas or air and an outlet passageway disposed in a second end portion opposite the first end portion of the hollow body. This now makes it possible to added advantage to increase, e.g. double the air feed in the same time with the same speed.

In yet another advantageous aspect of the invention the immersed aerator is characterized by it being suspended by at least two suspension devices which now makes it possible to set it precisely level in harmonizing bubble formation in aeration.

In still a further advantageous aspect of the invention the immersed aerator is characterized by at least one of the suspension devices being configured as a feeder for the diffuser with the advantage of making for a simplified arrangement whilst reducing the risk of suspension devices and feeders becoming entangled.

In yet another advantageous aspect of the invention the immersed aerator is characterized by the outlet passageway being disposed near to the bottom of the hollow body operationally. This facilitates evacuating fluid still therein when evacuating the immersed aerator to advantage in preventing a short-circuit flow of the evacuating gas above the bottom of the hollow body.

In a further advantageous aspect of the invention the first passageway of the end part is provided with non-return valves preventing a liquor flow, for instance of the wastewater through the first passageway from the hollow body, advantageously making sure that no unwanted materials have access to the air feed of the diffuser.

In still another advantageous aspect of the invention the immersed aerator is characterized by a ballast weight enabling the device in accordance with the invention to be individualized to the necessary conditions or marginal circumstances as dictated by the wastewater and also by the situation in operating the immersed aerator in each case.

In another advantageous aspect of the invention the immersed aerator is characterized by a hollow body configured as a shallow cylinder whose circumferential wall forms a hub mounting the spoked arrangement of the diffusers, for example, in the form of diffuser tubes and the like. Configuring the immersed aerator in accordance with the invention in this way permits making use of the operating principle in accordance with the invention also with immersed aerators figured otherwise, especially including such immersed aerators employed decentralized as single aerators.

In yet a further advantageous aspect of the immersed aerator in accordance with the invention it is again characterized by a hollow body configured as a shallow cylinder but here with the diffusers topping the cylinder. Here too, the same as in the example aspect as described before, the device in accordance with the invention can be individualized to comply with given, possible already existing systems, now with the special advantage afforded by the device in accordance with the invention of, namely, in surfacing an immersed aerator with no problem.

In still a further advantageous aspect of the invention an immersed aerator is characterized by the floodable hollow body being configured as an elongated tube, from the outer wall of which diffusers extend substantially perpendicular thereto, here again with the advantages of the aspects as just described, namely adapting and integrating the device in accordance with the invention to/in already existing systems or combining the device in accordance with the invention with the other possible advantages of the variants, hollow bodies and diffusers as already described.

Further features and advantages of the invention read from the sub-claims.

For a better appreciation of the invention it will now be detailed by way of a few examples with reference to the drawing in which.

Figure 1:
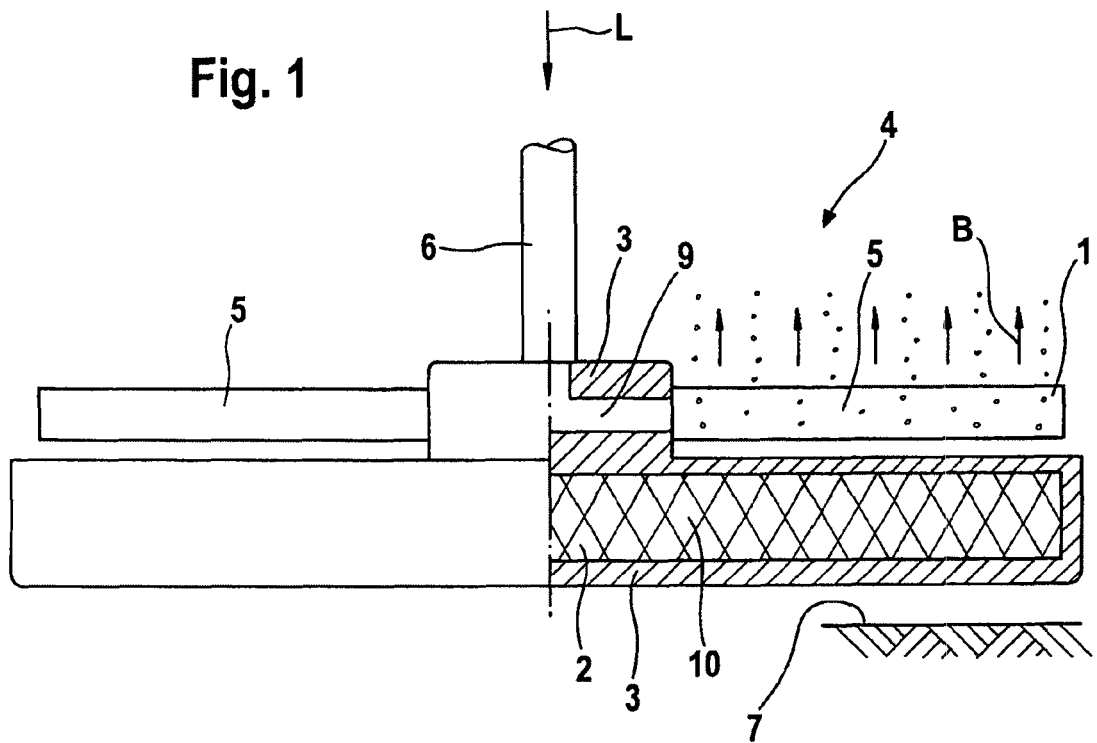
FIG. 1 is a very simplified diagrammatic view of one example aspect of an immersed aerator in accordance with the invention shown partially sectioned.
Figure 2:
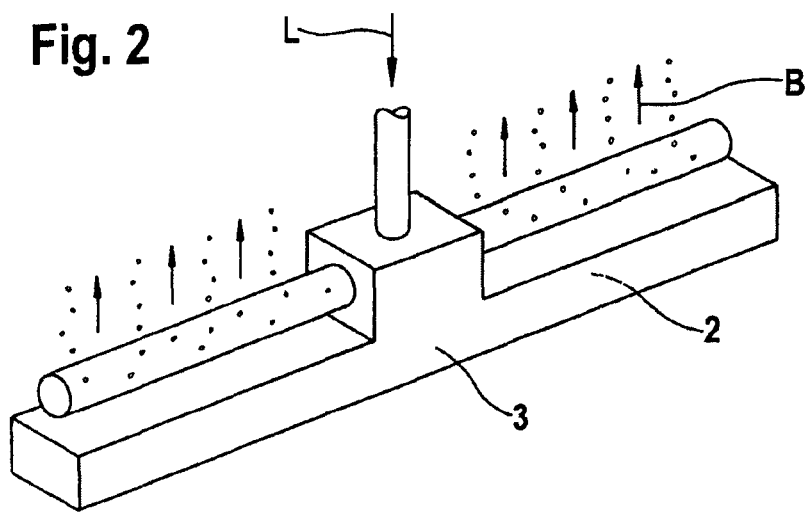
FIG. 2 is a view in perspective of the immersed aerator as showing FIG. 1.

Referring now to FIG. 1 there is illustrated in a very simplified diagrammatic view an immersed aerator 4 including a carrier 3 mounting a diffuser 1. The carrier 3 is configured as a floodable hollow body 2 in which the cavity 10 of the floodable hollow body 2 here and otherwise is depicted cross-hatched for a better appreciation. Via a gas feeder 6, for example, air is fed in the direction of the arrow L into the immersed aerator ported via the carrier 3 of the diffuser 1. The path of the air bubbles ascending from the diffuser 1 to the surface of the water is in the direction of the arrows B. Referring now to FIG. 2 in addition to FIG. 1 there is illustrated how the carrier 3 configured as a floodable hollow body 2 has the shape of an elongated cube. The surface area depicted cross-hatched in the hollow body 2 can be filled or flooded with liquor in operation of the immersed aerator, reducing the buoyancy of the immersed aerator in accordance with the invention to the extent in which the hollow body 2 is flooded with the intention of maintaining it at a stable level preferably near to the bottom 7 as depicted diagrammatically.

Figure 3:
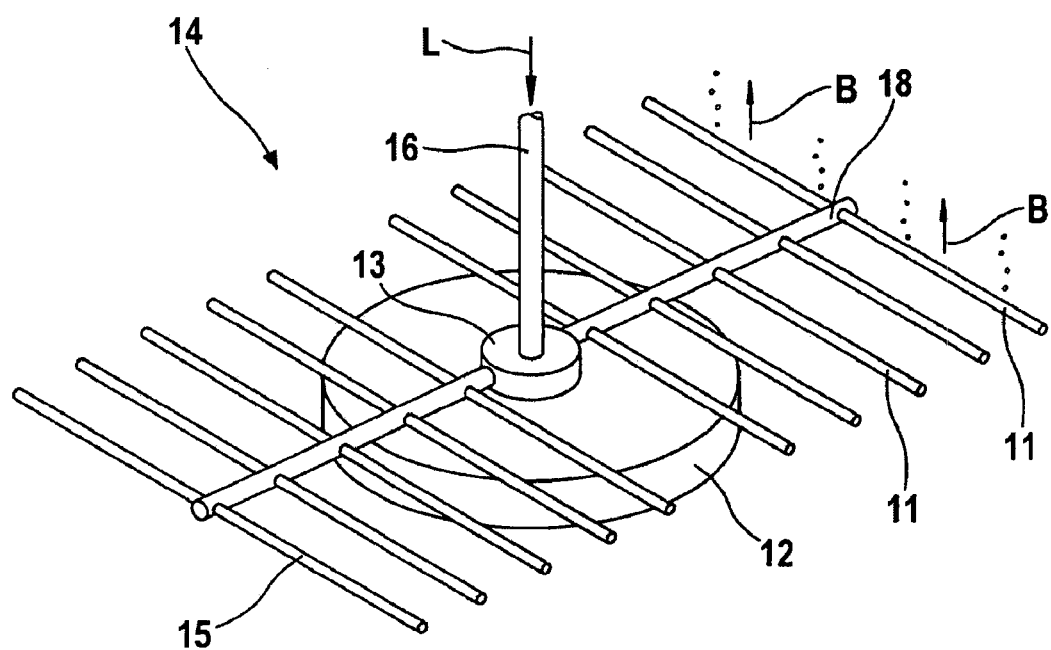
FIG. 3 is again a very simplified diagrammatic view of another example aspect of the immersed aerator in accordance with the invention shown in perspective.

Referring now to FIG. 3 there is illustrated a further example aspect of the invention, depicting in this case a carrier 13 configured integrated with a shallow cylindrical hollow body as a floodable hollow body 12. Mounted on a cross-beam 18, which as shown in FIG. 3 is carried by the carrier 13 as an air feeder, are diffusers 11 with conventional diffuser tubes 15 as depicted diagrammatically. The special advantage afforded by this arrangement is that a single floodable hollow body 12 serves for a whole battery of diffuser tubes 15. In principle the air feed into the diffusers 11 is the same as the gas feed as shown in the example aspects of FIG. 1 and FIG. 2. Thus, each of the diffusers 11 has an air feed in the direction of the arrows L again via a gas feeder 16, here again the direction of the air bubbles ascending from the diffusers 11 to the water surface being symbolized in the direction of the arrows B.

Figure 4:
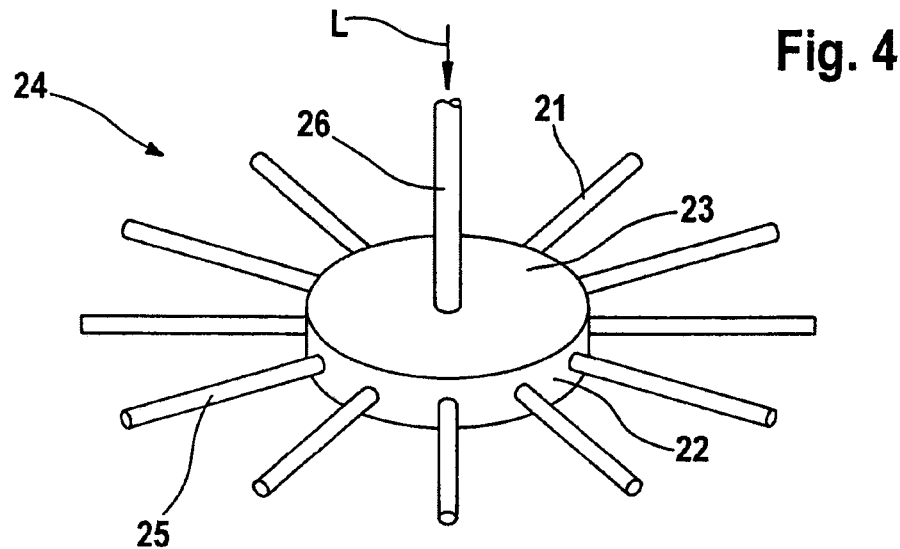
FIG. 4 is again a very simplified diagrammatic view of yet another example aspect of the immersed aerator in accordance with the invention shown in perspective.
Figure 5:
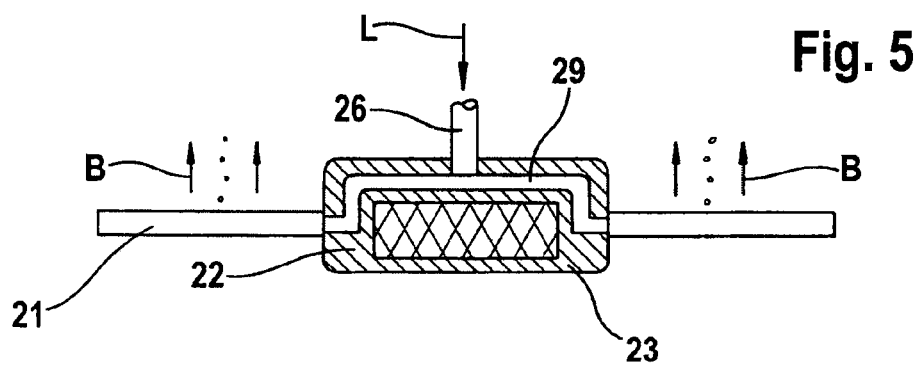
FIG. 5 is a diagrammatic view of the immersed aerator as shown in FIG. 4 shown sectioned.

Referring now to FIG. 4 there is illustrated another example aspect of an immersed aerator 24 comprising a central carrier 23 or central hollow body 22 mounting a spoked arrangement of the diffusers 21 receiving a spoked gas feed via a gas feeder 26. Referring now to FIG. 5 there is illustrated for a better appreciation of the aspect as shown in perspective in FIG. 4 the diffuser in a diagrammatically sectioned view. Via the gas feeder 26 air is fed via an air passageway 29 into the diffusers 21 which ascends to the surface of the water in the direction of the arrows B.

Figure 6:
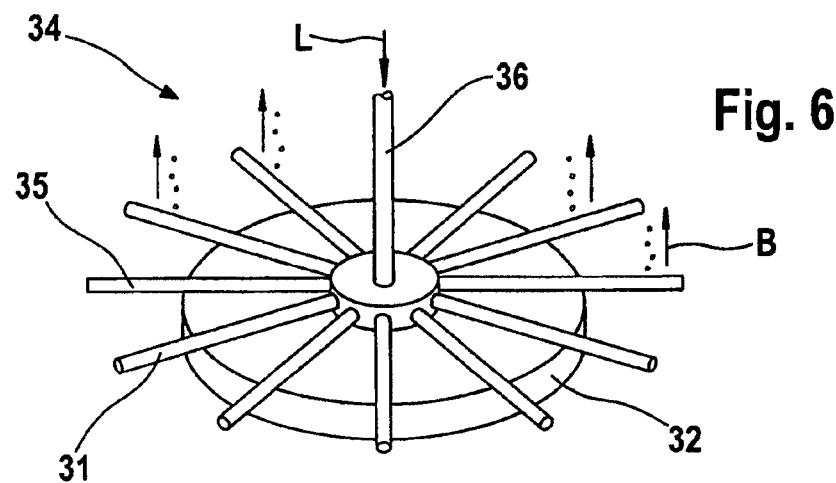
FIG. 6 is a view of still another example aspect of an immersed aerator in accordance with the invention.

Referring now to FIG. 6 there is illustrated yet another example aspect of the invention in the form of a spoked arrangement of the immersed aerator 36 in which the functioning of the various components is in principle the same as already described with reference to FIGS. 3 and 4. Here too, there is depicted the advantage of the configuration as shown in FIG. 3 involving a plurality of diffusers in combination with a single floodable hollow body 32.

Figure 7:
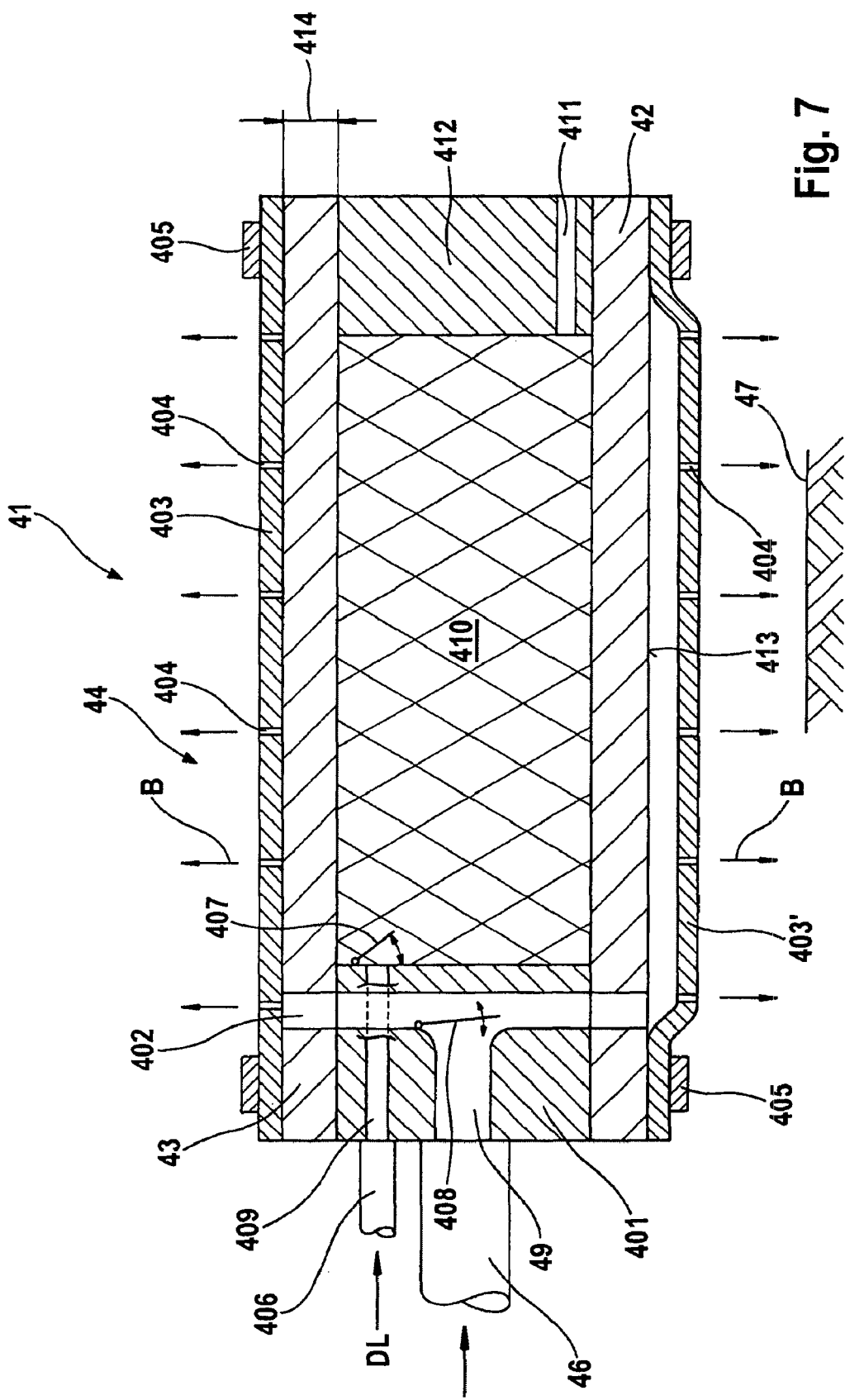
FIG. 7 is a view of a further example aspect of an immersed aerator in accordance with the invention.

Referring now to FIG. 7 there is illustrated still a further example aspect of an immersed aerator 44 in accordance with the invention including a carrier 43 doubling in function as a hollow body 42. The passageway 46 ports via a coupling (not shown) into an end part 401 sealing off the left-hand side of the immersed aerator 41 as shown in FIG. 7 in the interior portion of the carrier 43 also forming the hollow body 42. The end part 401 has a gas feeder passageway 49 via which air is directed through drillings 402 in the carrier 43 between the outer wall 413 of the carrier 43 and a membrane 403 surrounding the outer wall 413 through which air can escape via pores 404 to ascend to the surface of the water in the direction of the arrows B. Clamps 405 clamp the membrane 403 to the outer shell of the carrier 43 respectively hollow body 42 configured, for example, cylindrical. In the cavity 410 of the hollow body 42 the floodable portion is depicted cross-hatched. A feeder 406 ports likewise in the end part 401 into the gas feeder passageway 409 via which the cavity 410 of the hollow body 42 can be filled with compressed air. The liquor in the cavity 410 is evacuated via an outlet passageway 411 disposed on the right-hand side of the immersed aerator 41 as shown in FIG. 7 in an end part 412. When compressed air is directed in the direction of the arrows DL via the feeder 406 and the gas feeder passageways 409 into the end part 401 in the cavity 410 of the immersed aerator 41, the liquor in the cavity 410 is evacuated by an outlet passageway 411 evacuating the cavity 410, increasing the buoyancy of the immersed aerator 41 to such an extent that it ascends to the surface of the water.

By means of this design of the immersed aerator in accordance with the invention by using compressed air to pump up or drain the floodable hollow body it can be caused to ascend to the surface of the water for maintenance with no problem, after which the immersed aerator is returned in the water where it automatically becomes flooded to sink back down to its operating level.

Indicated diagrammatically furthermore in FIG. 7 is the basin bottom 47 in the vicinity of which the immersed aerator 41 has its operating level. Depending on the thickness 414 and weight of the wall of the hollow body 42 or also the material of the hollow body 42 and the volume of the cavity 410 the immersed aerator 41 can be set to ascend as desired.

Greatly simplified in FIG. 7 is the position of the membrane 403' in aeration operation at the underside of the immersed aerator 41 used to set the compressed air feed in this situation by reason of the overpressure building up between the outer wall 413 of the hollow body 42 and the membrane 403. The pores 404 of the elastic membrane 403 open to release air in the direction of the arrows B from the immersed aerator 41.

Non-return valves 407 and/or 408 are optional on gas feeder passageways 409 and 49 of the end part 401 to prevent a backflow of liquor from the cavity 410 into the gas feeder passageways 409 and 49 respectively to prevent the corresponding air feeders 406 and 46 from becoming fouled up.

Figure 8:
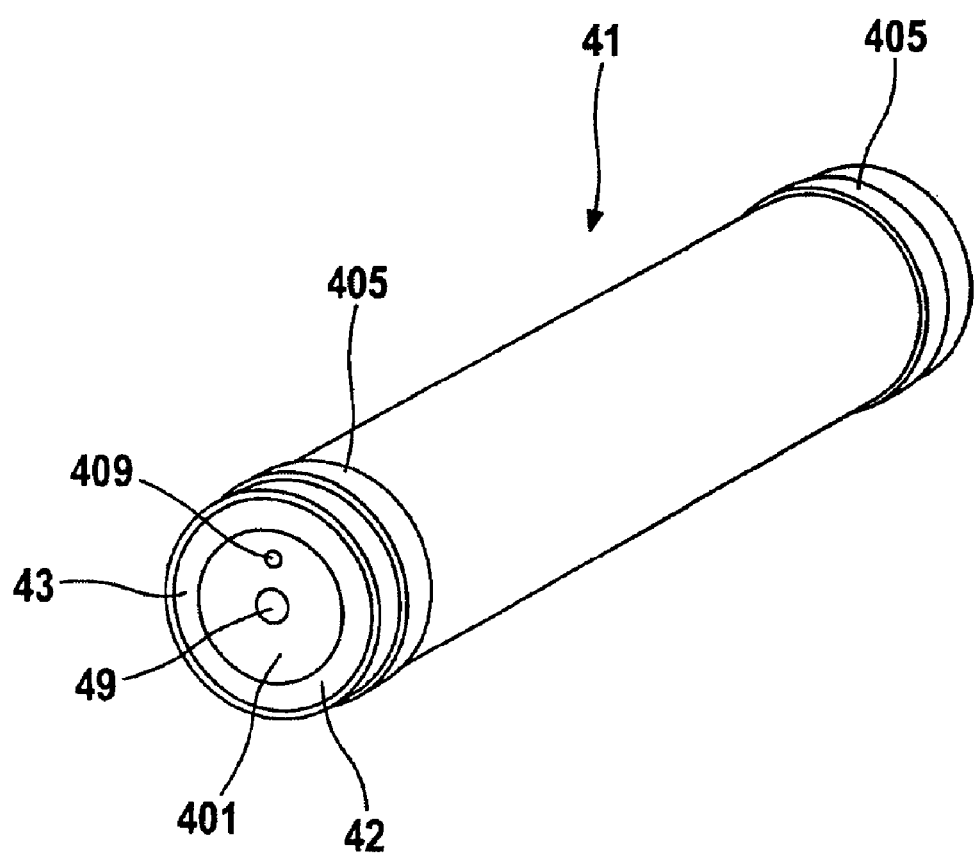
FIG. 8 is a view in perspective of the salient features of the immersed aerator as shown in FIG. 7.

Referring now to FIG. 8 there is illustrated the salient features of the immersed aerator 41 as shown in FIG. 7 in a view in perspective.

It is understood, of course, that the principle in accordance with the invention can be used just as well with plate aerators achieved in accordance with the design features as detailed for the example aspect as shown in FIG. 7. Making use of the principle of the immersed aerator in accordance with the invention permits a wealth of possible variants. Thus, it is understood that the invention and the scope of its claims is not restricted to the aspects shown herein by way of example.

Figure 9:
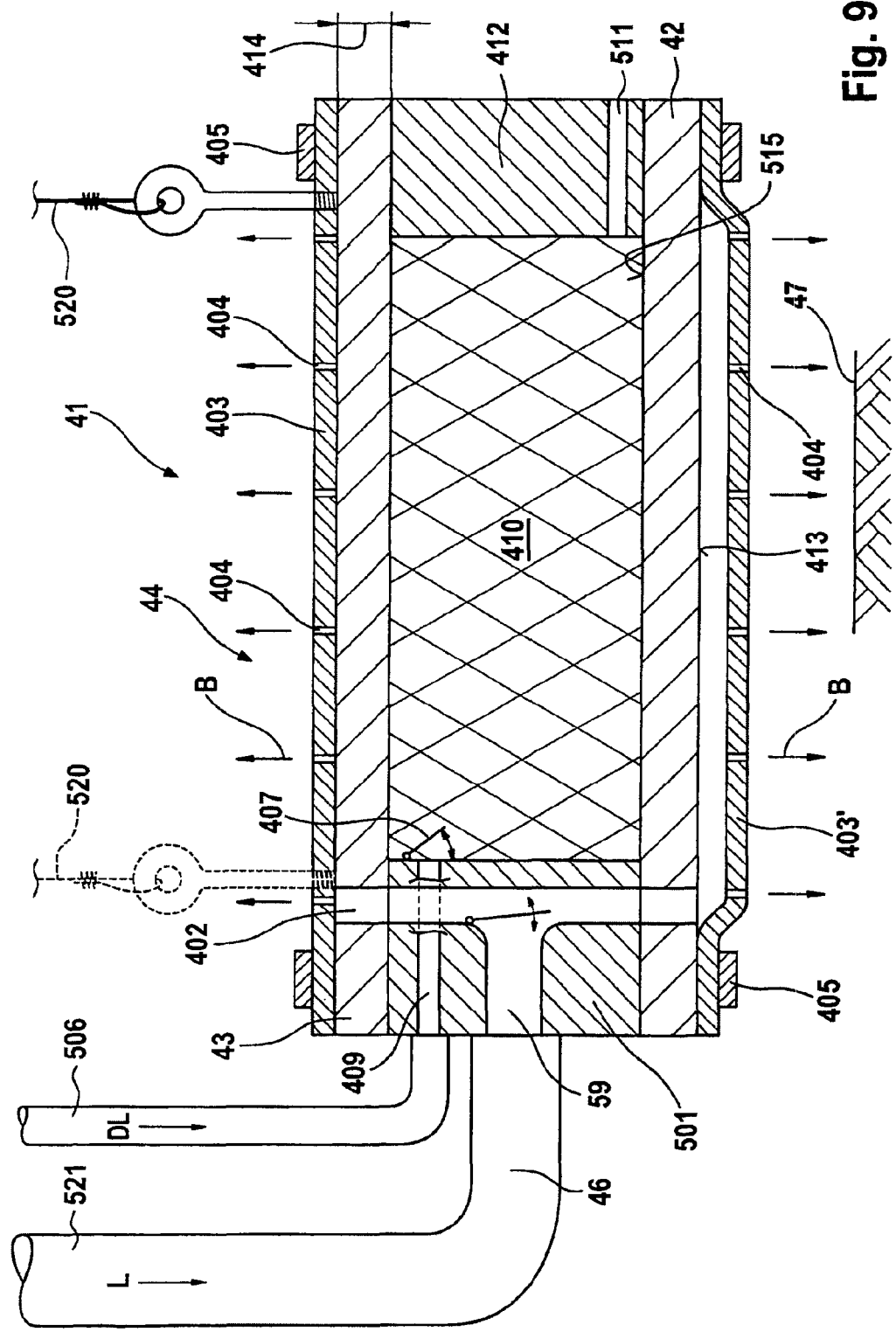
FIG. 9 is a view of still a further example aspect of an immersed aerator in accordance with the invention.

Referring now to FIG. 9 there is illustrated how the immersed aerator comprises on the left-hand side of the drawing a feeder 521 normally directed upwards, for example for an air feed (not shown) in the direction of the arrow L. A compressed air feeder 506 feeds air to the cavity to fill it with gas or air to cause the immersed aerator to ascend and to evacuate the liquor contained therein. Although it is possible to suspend the immersed aerator by a suspension device 502 shown in bold or broken lines, it is also just as possible to arrange for the immersed aerator to be carried solely by the feeder 521 and a suspension device 520 or just by two feeders 521.

Figure 10:
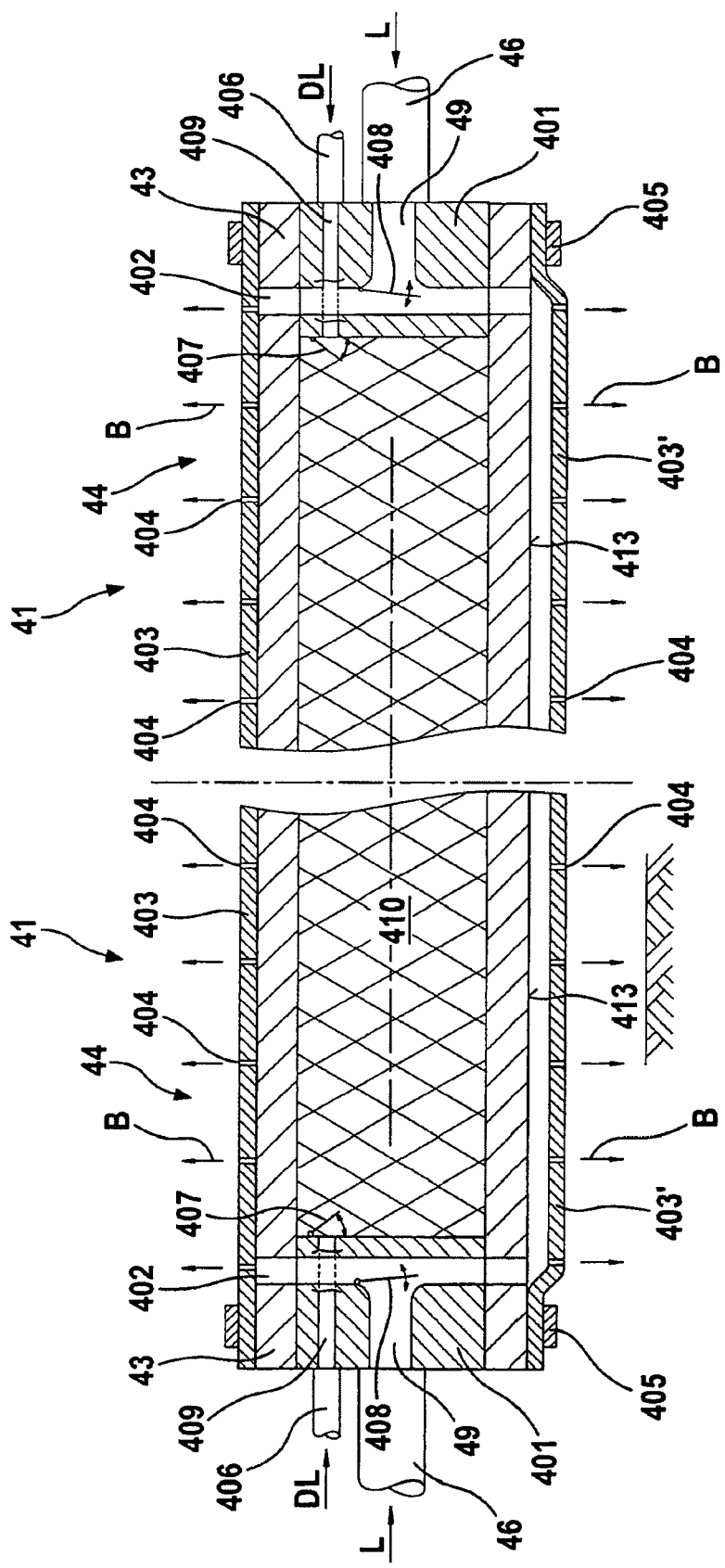
FIG. 10 is a view of another example aspect of an immersed aerator in accordance with the invention.

Referring now to FIG. 10 there is illustrated still a further immersed aerator—depicted halved to save space—which as compared to the immersed aerator as shown in FIGS. 7 and 8 ends on both sides in a passageway 46 with an air feed L. Outlet passages for the fluid to be evacuated can be suitably provided at one end, e.g. as shown in FIGS. 7 and 8 and as described. It is, of course, just as possible to provide suspension devices (not shown) on this immersed aerator as shown in FIG. 10 as described before.

Agitation and aeration are alternated as follows:

When after aeration, orchestrated as known, is to be followed by a denitrification phase, introducing an anoxic phase in a zone to set aeration by the immersed aerator is done by shutting off the air feed via passageways 46, 49 via the feeder (s) 521, after which the cavity 410 is filled by feeding compressed air via feeders 406 and 409 to evacuate the fluid therein, usually a liquid, such as water or wastewater via the outlet passageway 411, 511. This causes the immersed aerator to tilt in the direction of the air feeder on the immersed aerator, to tilt further until it is standing upright on ascending to the surface of the water. This is the same procedure as performed while inspecting an immersed aerator. On it surfacing, the compressed air feed is shut off in the hollow body, resulting in the hollow body being refilled with liquor via the outlet passageway 411, 511 in thus becoming heavier to sink with reduced buoyancy. Once the immersed aerator has sunk to its lowest most position as restricted by the suspension devices, the procedure is repeated, i.e. the cavity 410 again being evacuated, causing the immersed aerator to re-ascend.

The anoxic phase for denitrification is thus created in accordance with the invention by alternating flooding and evacuation of the hollow body of the immersed aerator causing it to continuously bob up and down in it thus being changed in function to that of an agitator.

It is this bobbing up and down action of the immersed aerator, actually functioning as an agitator that agitates the liquor, preventing the system from sludging up.

To terminate denitrification this procedure is ceased, the immersed aerator flooded and recharged with air to aerate the liquor in down position of the aerator.

LIST OF REFERENCE NUMERALS

1, 11, 21, 31 diffuser
2, 12, 22, 32, 42 floodable hollow body
3, 13, 23, 33 carrier
4, 14, 24, 34, 41, 44 immersed aerator
5, 15, 25, 35 diffuser tubes or membrane aerator
6, 16, 26, 36, 46 gas feed
7, 47 bottom
9, 29 air passageway
10 cavity
18 cross-beam
49 first feeder passageway
59 second feeder passageway
401 first end part
402 passageway
403, 403' membrane
404 pore
405 clamp
406 compressed air feeder
407 non-return valve
408 non-return valve
409 passageway
410 Cavity
411 outlet passageway
412 end part
413 cylindrical outer wall
414 wall thickness
415 bottom
501 end part
502 passageway
509 passageway
511 outlet passageway
515 bottom
520 suspension device
521 feeder
B arrow, bubble movement direction
L arrow, air feed direction
DL arrow, compressed air feed direction

The invention claimed is:

1. A process for liquor—particularly wastewater—agitation and/or aeration having the following cyclically repeated steps a) and b):
   a) aerating the liquor by means of an immersed aerator for a predetermined first period of time using a diffuser disposed on a carrier designed as a floodable hollow body, the hollow body being flooded and air being brought into the liquor by the diffuser, making it possible to create nitrification in the liquor;
   b) agitating the liquor by means of the immersed aerator for a predetermined second period of time, the air feed by the diffuser being throttled or turned off, and the previously flooded hollow body being evacuated in order to fill the hollow body with gas or air, the immersed aerator assuming the function of an agitator by rising upward in the liquor, thus agitating the liquor, making denitrification possible in the liquor.

2. The process as set forth in claim 1, wherein the first and the second period of time are timed by a controller.

3. An immersed aerator for implementing the process as set forth in claim 1 comprising at least one diffuser disposed on a carrier, wherein the immersed aerator comprises at least one floodable hollow body as formed by the carrier.

4. The immersed aerator as set forth in claim 3, wherein the floodable hollow body is configured as an elongated tube.

5. The immersed aerator as set forth in claim 4, wherein the floodable hollow body is configured as a tube of rectangular, round or elliptic cross-section.

6. The immersed aerator as set forth in claim 4, wherein the floodable hollow body is configured as an elongated tube, from the outer wall of which diffusers extend substantially perpendicular thereto.

7. The immersed aerator as set forth in claim 3, wherein the floodable hollow body is equipped with a compressed air feeder for filling the hollow body with gas or air.

8. The immersed aerator as set forth in claim 3, further comprising a perforated membrane enveloping the carrier at least partly and a gas feeder for feeding gas between the carrier and the membrane.

9. The immersed aerator as set forth in claim 3, further comprising a ballast weight.

10. The immersed aerator as set forth in claim 3, further comprising a hollow body configured as a shallow cylinder whose circumferential wall forms a hub mounting a spoked arrangement of the diffusers.

11. The immersed aerator as set forth in claim 3, further comprising a hollow body configured as a shallow cylinder with diffusers topping the cylinder.

12. A process for liquor—particularly wastewater—agitation and/or aeration having the following cyclically repeated steps a) and b):
   a) aerating the liquor by means of an immersed aerator for a predetermined first period of time using a diffuser disposed on a carrier designed as a floodable hollow body, the hollow body being flooded and air being brought into the liquor by the diffuser, making it possible to create nitrification in the liquor;
   b) agitating the liquor by means of the immersed aerator for a predetermined second period of time, the air feed by the diffuser being throttled or turned off, and the previously flooded hollow body being evacuated in order to fill the hollow body with gas or air, the immersed aerator assuming the function of an agitator by rising upward in the liquor, thus agitating the liquor, making denitrification possible in the liquor, at least one diffuser disposed on a carrier, wherein the immersed aerator comprises at least one floodable hollow body as formed by the carrier, and wherein a perforated membrane enveloping the carrier at least partly and a gas feeder for feeding gas between the carrier and the membrane, and wherein the immersed aerator comprises a first end part disposed in a first end portion of the hollow body, a first passageway for feeding compressed air to the diffuser and a second passageway for feeding compressed air to fill the hollow body with gas or air as well as an outlet passageway disposed in a second end portion opposite the first end portion for evacuating the liquor contained in the hollow body.

13. The immersed aerator as set forth in claim 12, wherein the immersed aerator comprises, disposed in a second end portion opposite the first end portion of the hollow body, a second end part with a feeder passageway for feeding the diffuser with gas or air and an outlet passageway.

14. The immersed aerator as set forth in claim 13, wherein the outlet passageway is disposed near to the bottom of the hollow body operationally.

15. The immersed aerator as set forth in claim 12, wherein the immersed aerator is suspended by at least two suspension devices.

16. The immersed aerator as set forth in claim 15, wherein at least one of the suspension devices is configured as a feeder for the diffuser.

17. The immersed aerator as set forth in claim 12, wherein the first passageway and/or the second passageway is provided with non-return valves preventing a liquor flow through the first or second passageway from the hollow body.

* * * * *